United States Patent
Brandon et al.

(10) Patent No.: US 9,651,014 B2
(45) Date of Patent: May 16, 2017

(54) DOUBLE SOURCE BATTERY CHARGER

(71) Applicant: Techtronic Outdoor Products Technology Limited, Hamilton (BM)

(72) Inventors: George Brandon, Anderson, SC (US); Mina William Atta, Anderson, SC (US)

(73) Assignee: TECHTRONIC OUTDOOR PRODUCTS TECHNOLOGY LIMITED, Hamilton (BM)

( * ) Notice: Subject to any disclaimer, the term of this patent is extended or adjusted under 35 U.S.C. 154(b) by 381 days.

(21) Appl. No.: 14/060,269

(22) Filed: Oct. 22, 2013

(65) Prior Publication Data
US 2014/0110951 A1   Apr. 24, 2014

Related U.S. Application Data

(60) Provisional application No. 61/716,959, filed on Oct. 22, 2012.

(51) Int. Cl.
*H02J 7/00* (2006.01)
*H02J 7/14* (2006.01)
(Continued)

(52) U.S. Cl.
CPC ........ *F02N 11/0862* (2013.01); *H02J 7/0052* (2013.01); *H02J 7/0055* (2013.01);
(Continued)

(58) Field of Classification Search
CPC ............... Y02T 10/705; Y02T 10/7005; Y02T 10/7008; Y02T 90/14; Y02T 90/121;
(Continued)

(56) References Cited

U.S. PATENT DOCUMENTS 3,307,097 A * 2/1967 Brewster .............. H02H 7/1257
320/165
5,503,804 A * 4/1996 Fujishita ............... F01N 3/2013
422/109
(Continued)

FOREIGN PATENT DOCUMENTS

CN   100544160   9/2009
CN   101549652 B   5/2011
(Continued)

OTHER PUBLICATIONS

Mexican Patent Office Action for Application No. MX/a/2013/012343 dated Jul. 31, 2015 (3 pages).

*Primary Examiner* — Richard Isla Rodas
*Assistant Examiner* — Mohammed J Sharief
(74) *Attorney, Agent, or Firm* — Michael Best & Friedrich LLP (57) ABSTRACT

A system and method for a double source battery charger of an engine-generator. The double source battery charger of the engine-generator includes an electric starter and a battery. The electric starter is selectively energized by the battery to start an engine of the engine-generator. The double source charger maintains the battery at a desired charge such that the battery has sufficient charge to energize the electric starter. The double source battery charger is selectively coupled to one of two power sources to charge the battery: an alternator of the engine-generator and an external AC source, such as a standard 120 Volt or 240 Volt wall outlet. As a result, the battery is charged by either power from a wall outlet or, if the generator is running, by power provided from the alternator.

23 Claims, 9 Drawing Sheets

(51) Int. Cl.
  *F02N 11/08*  (2006.01)
  *F02N 11/14*  (2006.01)

(52) U.S. Cl.
  CPC ......... *H02J 7/1415* (2013.01); *F02N 11/0866* (2013.01); *F02N 11/14* (2013.01); *H02J 2007/0095* (2013.01)

(58) Field of Classification Search
  CPC ... Y02E 60/12; H02K 7/18; H02P 9/04; H02J 7/022; H02J 7/0031
  USPC .................................................. 320/104, 138
  See application file for complete search history.

(56) References Cited

U.S. PATENT DOCUMENTS

| | | | |
|---|---|---|---|
| 5,610,499 A * | 3/1997 | Rogers | B60L 11/1861 320/137 |
| 5,842,534 A | 12/1998 | Frank | |
| 6,098,734 A | 8/2000 | Kawamura | |
| 6,313,543 B1 * | 11/2001 | Frank | F02B 63/04 123/2 |
| 6,326,765 B1 | 12/2001 | Hughes et al. | |
| 6,833,683 B2 | 12/2004 | Winkler | |
| 6,838,781 B2 * | 1/2005 | van de Loo | B60L 11/1816 290/40 B |
| 7,595,606 B2 | 9/2009 | Loubeyre | |
| 7,746,026 B2 * | 6/2010 | Koziara | B60L 3/0046 320/104 |
| 7,769,505 B2 | 8/2010 | Rask et al. | |
| 7,830,117 B2 | 11/2010 | Ambrosio et al. | |
| 7,884,574 B2 | 2/2011 | Fukumura et al. | |
| 7,911,180 B2 | 3/2011 | Esmaili et al. | |
| 7,938,092 B2 | 5/2011 | Yang | |
| 8,042,631 B2 | 10/2011 | Grieve et al. | |
| 8,080,761 B2 | 12/2011 | Matthews et al. | |
| 2004/0183514 A1 * | 9/2004 | Maehara | H02J 7/244 323/286 |
| 2005/0141154 A1 | 6/2005 | Consadori et al. | |
| 2007/0181547 A1 | 8/2007 | Vogel et al. | |
| 2008/0034773 A1 | 2/2008 | Karapetian | |
| 2008/0079264 A1 * | 4/2008 | Serdynski | F02B 63/04 290/30 A |
| 2008/0084182 A1 * | 4/2008 | Oberlin | H01M 10/052 320/116 |
| 2009/0284022 A1 * | 11/2009 | Usselman | F02D 29/06 290/38 R |
| 2009/0284074 A1 | 11/2009 | Yeh | |
| 2010/0229581 A1 | 9/2010 | Truckenbrod et al. | |
| 2010/0319645 A1 | 12/2010 | Yang | |
| 2011/0025126 A1 * | 2/2011 | Brabec | B60L 11/1861 307/9.1 |
| 2011/0198141 A1 | 8/2011 | Clark et al. | |
| 2011/0231034 A1 | 9/2011 | Kinser et al. | |
| 2012/0112544 A1 * | 5/2012 | Salcone | H02J 7/0047 307/65 |
| 2012/0143425 A1 | 6/2012 | Yamamoto et al. | |

FOREIGN PATENT DOCUMENTS

| | | |
|---|---|---|
| CN | 102431547 | 5/2012 |
| DE | 102010040239 | 3/2012 |
| FR | 2933647 | 1/2010 |
| WO | 2010132443 | 11/2010 |
| WO | 2012028508 | 8/2012 |

* cited by examiner

DOUBLE SOURCE BATTERY CHARGER

CROSS-REFERENCE TO RELATED APPLICATIONS

The application claims priority to U.S. Provisional Patent Application No. 61/716,959, filed Oct. 22, 2012, the entire contents of which are incorporated herein by reference.

FIELD OF THE INVENTION

The invention relates to battery chargers and engine-generators.

BACKGROUND

Engine-generators, also referred to as gen-sets, generally include an internal combustion engine that drives an alternator to generate electricity. The alternator includes a rotor and a stator. A drive shaft of the engine rotationally drives the rotor, which induces current in the stator. The induced current forms the output of the generator.

SUMMARY OF THE INVENTION

In one embodiment, the invention provides a double source battery charger for an engine-generator having an electric starter and a battery. The electric starter for the engine-generator is selectively energized by the battery to start an engine of the engine-generator. The double source charger maintains the battery at a desired charge such that the battery has sufficient charge to energize the electric starter. The double source battery charger is selectively coupled to two power sources to charge the battery: an alternator of the engine-generator and an external AC source, such as a standard 120 Volt or 240 Volt wall outlet. As a result, the battery is charged by either a wall outlet or, if the generator is running, by power provided from the alternator.

In another embodiment, the invention provides a method of charging a battery in a generator having a double source battery charger, an electric starter motor, an internal combustion engine, and an external power connector. The method includes coupling the battery to the electric starter motor to start the internal combustion engine and driving an alternator, by the internal combustion engine, to produce alternator output power. The method further includes detecting at least one of a presence of the alternator output power and an absence of external power from the external power source connector and, in response, controlling a switch to connect the alternator to the double source battery charger. The battery is then charged by the double source battery charger using the alternator output power from the alternator. The method also includes detecting at least one of an absence of the alternator output power and a presence of external power from the external power connector, and, in response, controlling the switch to connect the external power source connector to the double source battery charger. The battery is then charged by the double source battery charger using the external power from the external power connector.

In another embodiment, the invention provides a generator having a double source battery charger, a battery, an internal combustion engine, and an electric starter motor selectively coupled to the battery to start the internal combustion engine. The generator further includes an alternator having a rotor driven by the internal combustion engine and a stator in which alternator output power is induced when the rotor is driven. The alternator output power is provided at an alternator output. The generator also includes an external power source connector, a switch, and a battery charger. The external power source connector is operable to be coupled to an external power source and to provide external power at a connector output. The switch has a first input coupled to the alternator output, a second input coupled to the connector output, and a switch output. The battery charger is coupled to the battery and operable to charge the battery. The battery charger further has a power input coupled to the switch output such that the battery charger is selectively coupled, via the switch, to one of the alternator output and connector output to charge the battery using one of the alternator output power and the external power.

In another embodiment, the invention provides a method of charging a battery in a generator having a double source battery charger, an internal combustion engine, an electric starter motor selectively coupled to the battery to start the internal combustion engine, an alternator driven by the internal combustion engine to produce alternator output power, and an external power source connector operable to be coupled to an external power source to provide external power. The method includes detecting whether at least one of the alternator is producing alternator output power and the external power source connector is providing external power. The method further includes connecting one of the alternator and the external power source connector to an input of the double source battery charger based on the detection. The method also includes charging the battery, by the double source battery charger, using power received at the input from the connected one of the alternator and the external power source connector.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

It should also be noted that a plurality of hardware and software based devices, as well as a plurality of different structural components may be used to implement the invention. In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable medium) executable by one or more processors. As such, it should be noted that a plurality of hardware and software based devices, as well as a plurality of different structural components may be utilized to implement the invention. Furthermore, and as described in subsequent paragraphs, the specific mechanical configurations illustrated in the drawings are intended to exemplify embodiments of the invention and that other alternative mechanical configurations are possible. For example, "controllers" described in the specification can include standard processing components, such as one or more processors, one or more computer-readable medium modules, one or more input/output interfaces, and various connections (e.g., a system bus) connecting the components.

With reference to FIGS. 1A-E, a generator 100 is shown including a frame 105 having a folding handle 110 pivotable about hinge 115 to fold forward and down to meet the top side of the generator 100. The generator 100 further includes a fuel tank 120 with a fuel cap 122, a rechargeable battery 125, a main panel 130, an electric starter motor 135, an internal combustion engine 140, and an alternator 145. Although not shown, in some instances, two or more wheels are secured to the bottom of the frame 105 to ease in the transport of the generator 100. The generator 100 also includes a socket 150 for coupling to a wall outlet connector to charge the battery 125. The generator 100 further includes a pull starter cord 155 (shown without a grip handle) to optionally start the engine 140 without the use of the battery 125 and electric starter 135. The generator 100 includes a starter switch 156 to couple the electric starter 135 to the battery 125, and a fuel valve 158 to open/close a fuel supply line connecting the fuel tank 120 to the engine 140. The generator 100 also includes an idle control switch 157 to alter an idle control mode of the generator 100.

The main panel 130 is positioned adjacent to the fuel tank 120 and above the electric starter 135 and engine 140. In the illustrated embodiment, the main panel 130 includes four AC outlets 160, each having terminals for connecting to a three prong plug of an AC load. The AC outlets 160 are ground fault circuit interrupter (GFCI) outlets, although other outlet types may be included. The main panel 130 further includes a 120/240 Volt AC outlet 165. The AC outlets 160 and 165 are protected from water and contaminant (e.g., dust) infiltration via covers (not shown), which may be made of rubber or another suitable material. In some embodiments, DC outlets are also provided on the main panel 130 or elsewhere on the generator 100.

Figure 1A:
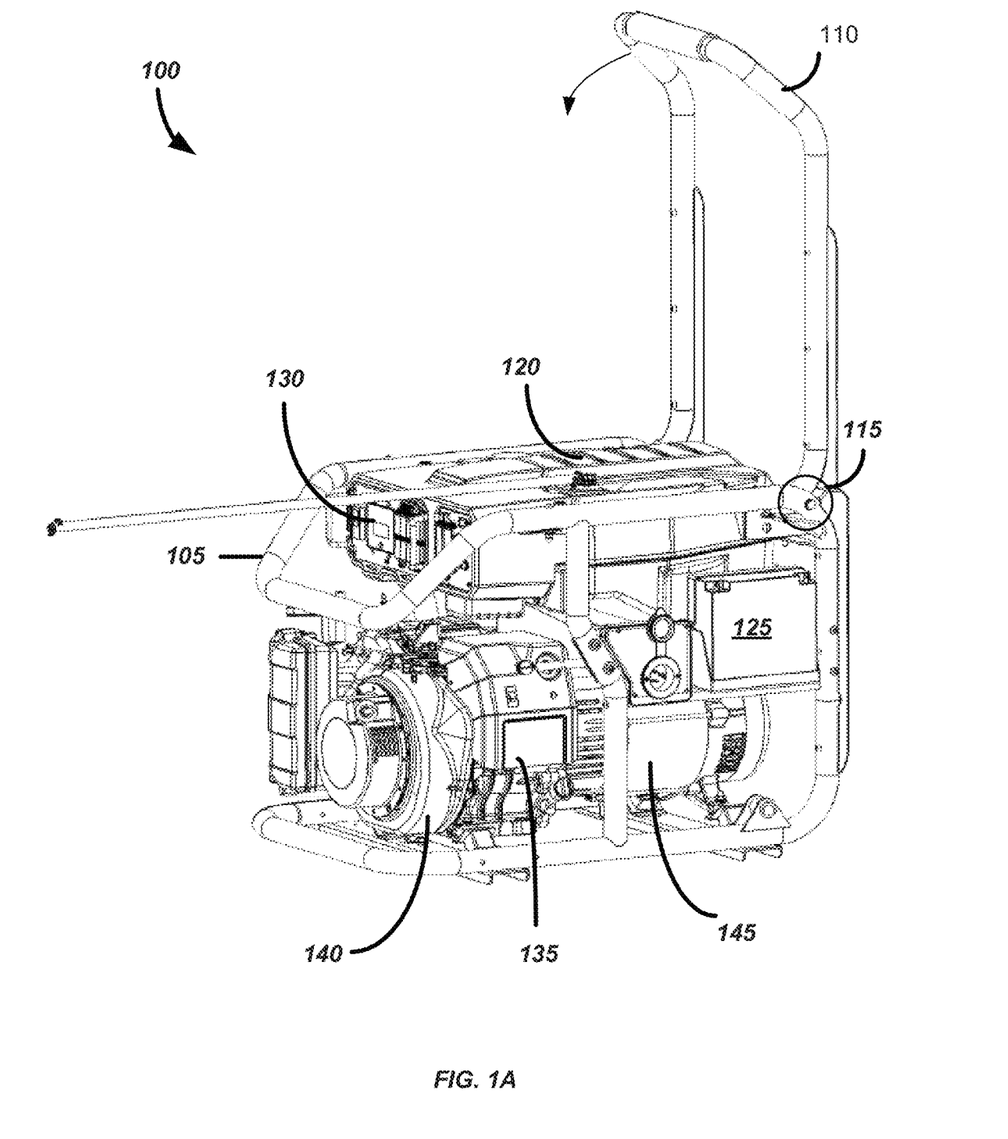
FIGS. 1A-E depict a generator with a double source battery charger according to an embodiment of the invention.
Figure 1B:
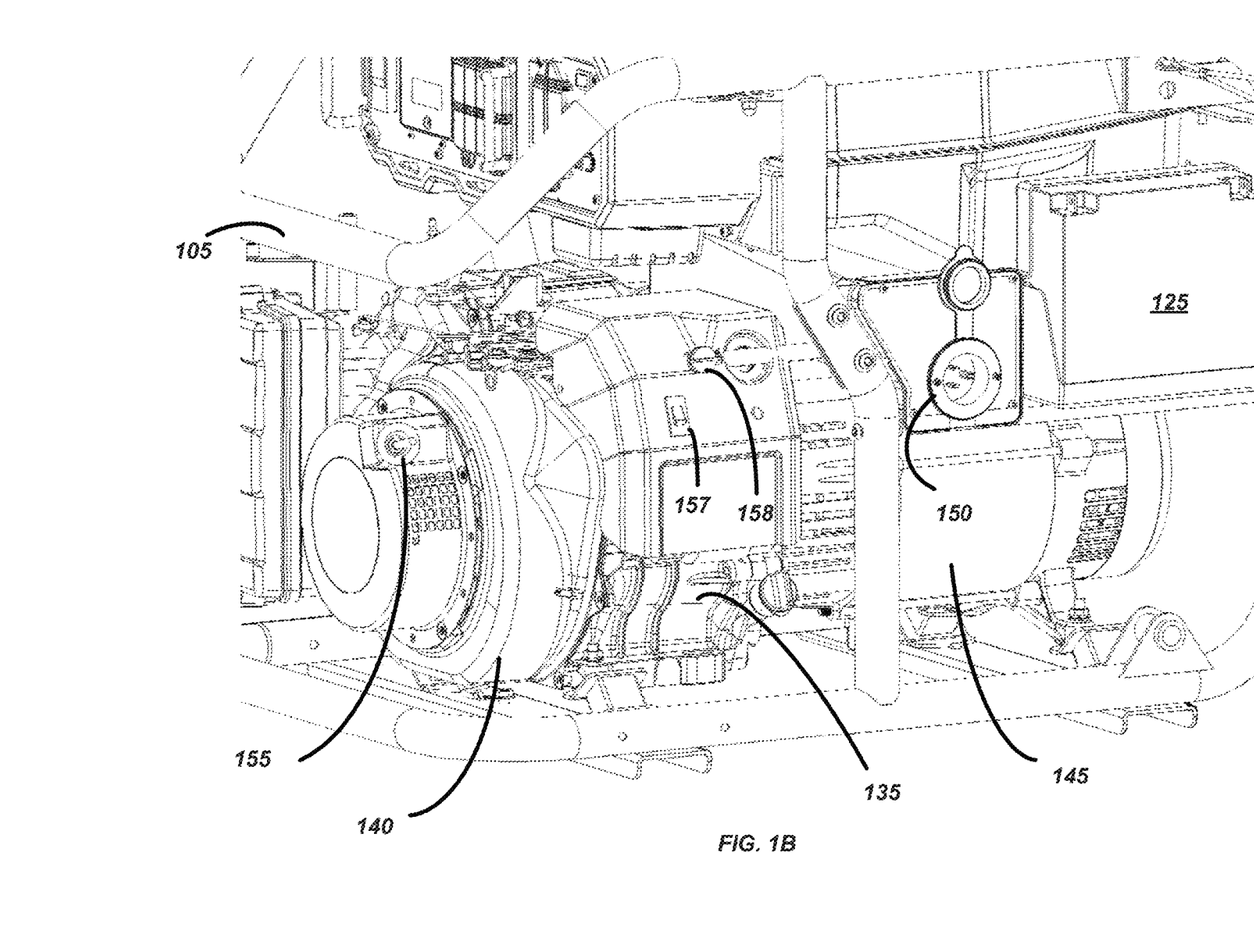
Figure 1C:
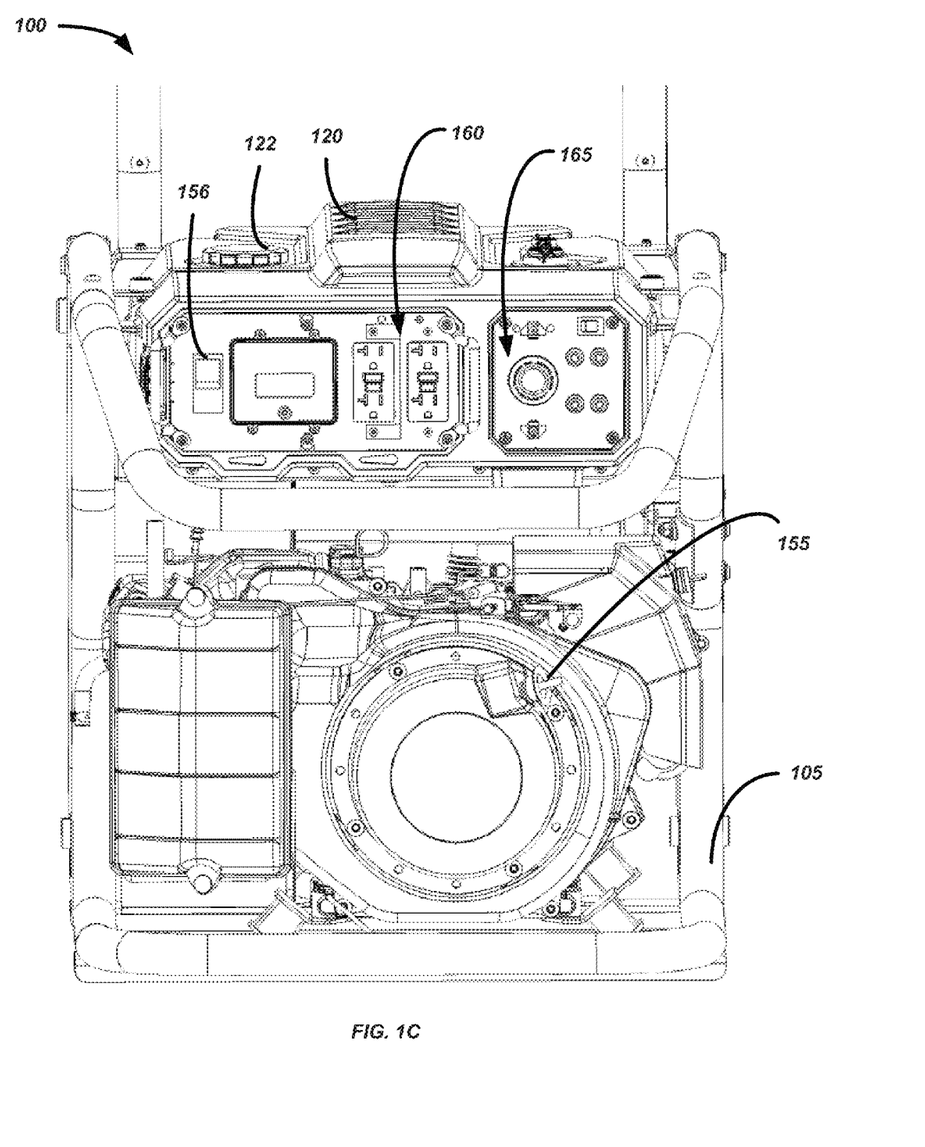
Figure 1D:
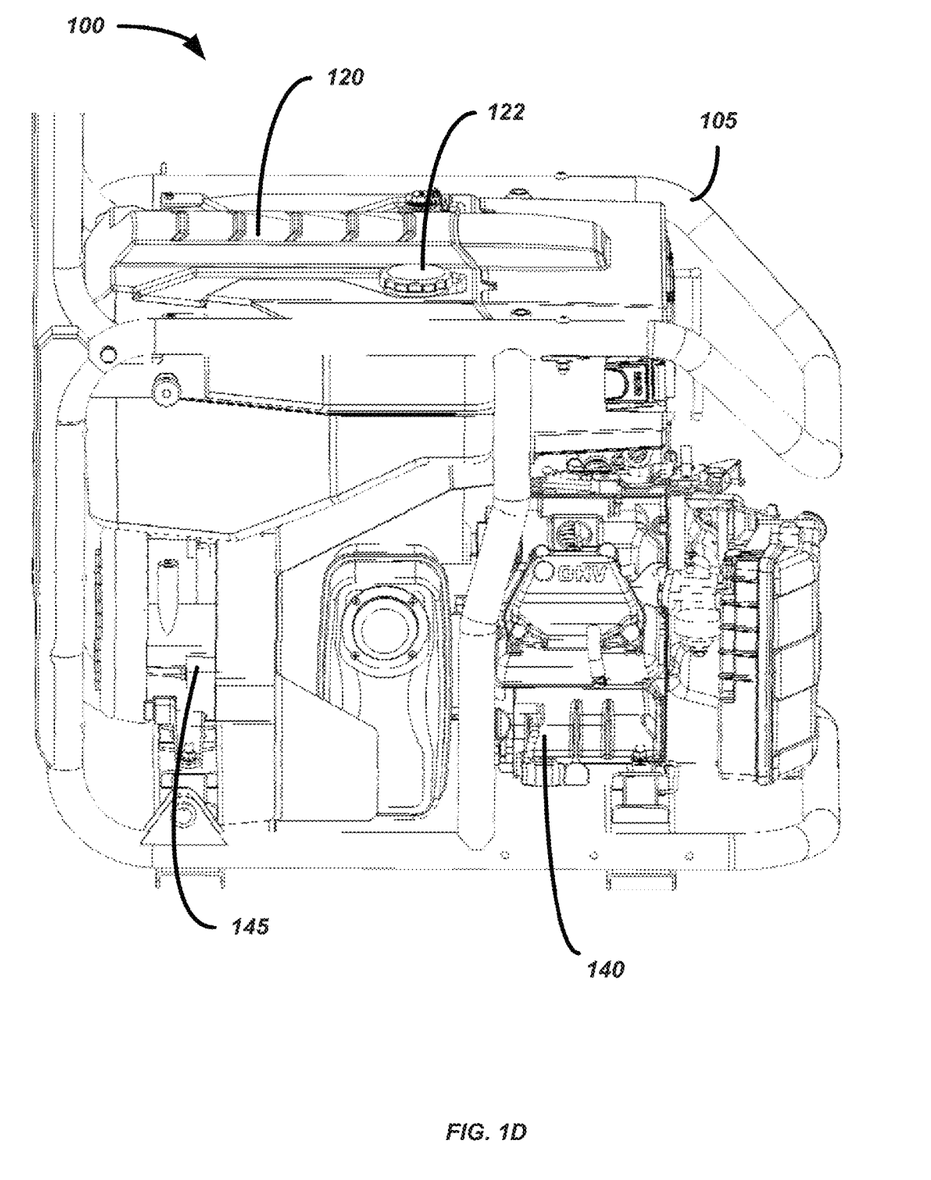
Figure 1E:
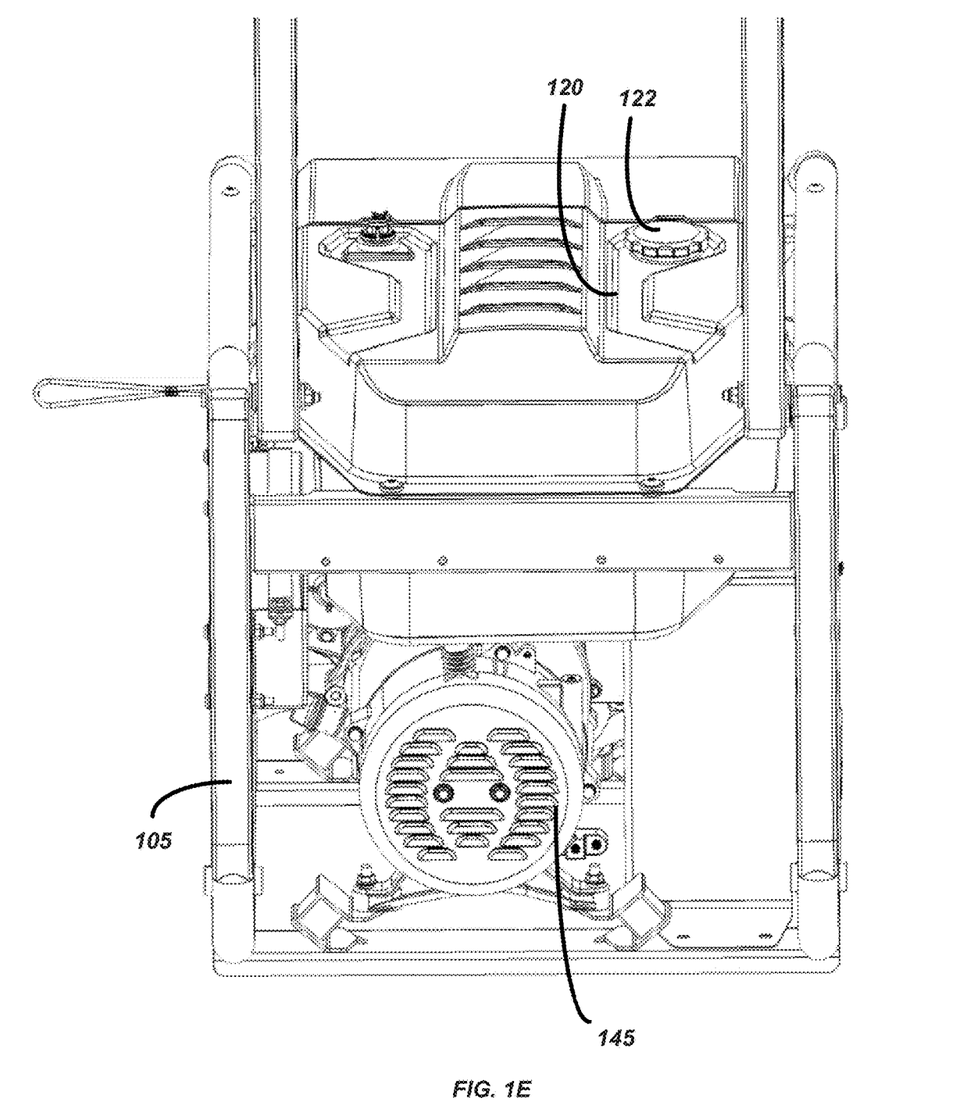
Figure 2:
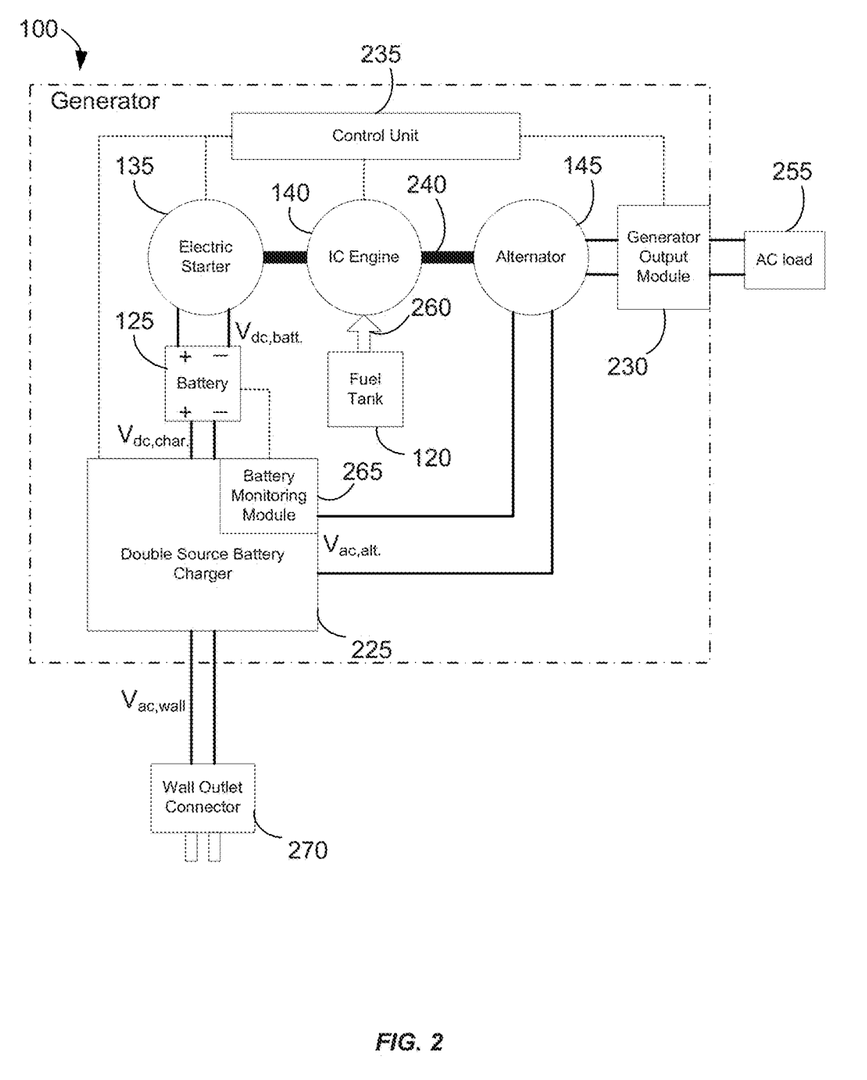
FIG. 2 depicts a block diagram of the generator system.

With reference to FIG. 2, the generator 100 further includes a double source battery charger 225, a generator output module 230, and a controller 235. The engine 140 rotates an output shaft 240 when enabled, which rotates a rotor (not shown) of the alternator 145. The rotating rotor induces an AC output from a stator (not shown) of the alternator 145. The AC output by the alternator 145 is received by the generator output module 230 and the double source battery charger 225.

The generator output module 230 conditions the AC power received from the alternator 145 to output to one or more AC loads 255 and/or DC loads (not shown). For example, in some constructions, the generator output module 230 includes a rectifier, inverter, and filtering components (not shown). The rectifier receives and rectifies the AC power output from the alternator 145 and outputs DC power to the inverter. The inverter then inverts the DC power and outputs the AC power to the filtering components. The filtering components assist in removing ripple, noise, etc. from the AC output by the inverter to provide a clean AC power signal to one or more AC loads 255. In some constructions, the generator output module 230 filters the AC signal from the alternator 145 and provides the filtered AC signal to the AC loads 255 without the additional rectifier and inverter stages. The AC loads 255 are coupled to the generator 100 via, for instance, a two or three-prong AC outlet (e.g., AC outlets 160) of the generator 100. Rectifier circuitry within the generator output module 230 rectifies the AC output from the alternator 145 and provides DC power, which may also be filtered, to one or more DC loads (not shown). The one or more DC loads are coupled to the generator output module 230 via DC sockets (not shown) on the generator 100. In some instances, the generator 100 includes more or fewer than four AC outlets 160 and the AC outlet 165. The controller 235 controls the generator output module 230 by, for instance, controlling high-speed switching elements and/or other components in a rectifier, an inverter, or both.

With continued reference to FIG. 2, the controller 235 controls and is coupled to the engine 140 and the electric starter 135. The controller 235 is operable to adjust a throttle 260 of the engine 140 to control the speed thereof. In addition, the controller 235 is operable to control additional operating properties of the engine 140. In FIG. 2, the dashed lines represent control and signal lines on which information or commands are passed. Additionally, the controller 235 controls the electric starter 135 for the engine 140 during start up. The electric starter 135 is a DC motor energized by the battery 125 to provide initial rotation of the output shaft 240 during start up. Rotation of the output shaft 240 along with opening the throttle 260 to provide fuel to the engine 140 enables starting of the engine 140. The electric starter 135 is selectively coupled to the battery 125, for instance, by the user-activated starter switch 156.

The double source battery charger 225 maintains the charge of the battery 125 such that the battery 125 is operable to provide power to the electric starter 135 sufficient to start the engine 140. The double source battery charger 225 includes a battery monitoring module 265 that senses information about the battery 125 (e.g., battery temperature, battery voltage, polarity) and relays the battery status information to the controller 235. The controller 235, in turn, may use the battery status information to control charging of the battery 125. In some embodiments, the double source battery charger 225 receives and uses the battery status information to control charging directly, rather than relying on the controller 235.

The double source battery charger 225 is operable to receive power from two power sources: the alternator 145 and an external AC source (not shown), such as a 120 Volt or 240 Volt wall outlet via a wall outlet connector 270. The double source battery charger 225 selectively connects battery charger circuitry to one of the alternator 145 and the external AC source to supply power to the battery charger circuitry. The battery charger circuitry, in turn, uses the power to provide charging current to the battery 125, as needed. When the generator 100 is operating, the double source battery charger 225 uses power from the alternator 145 to charge the battery 125. However, when the generator 100 is not operating, the double source battery charger 225 uses power from the external AC source, assuming that the wall outlet connector 270 is coupled to the external AC source. In some instances, the wall outlet connector 270 is coupled to an external DC source (not shown) to provide DC power to the double source battery charger 225, which is used to selectively charge the battery 125. Additionally, in some instances, the double source battery charger 225 receives DC power from a rectifier of the generator output module 230, rather than receiving AC power from the alternator 145.

Figure 3:
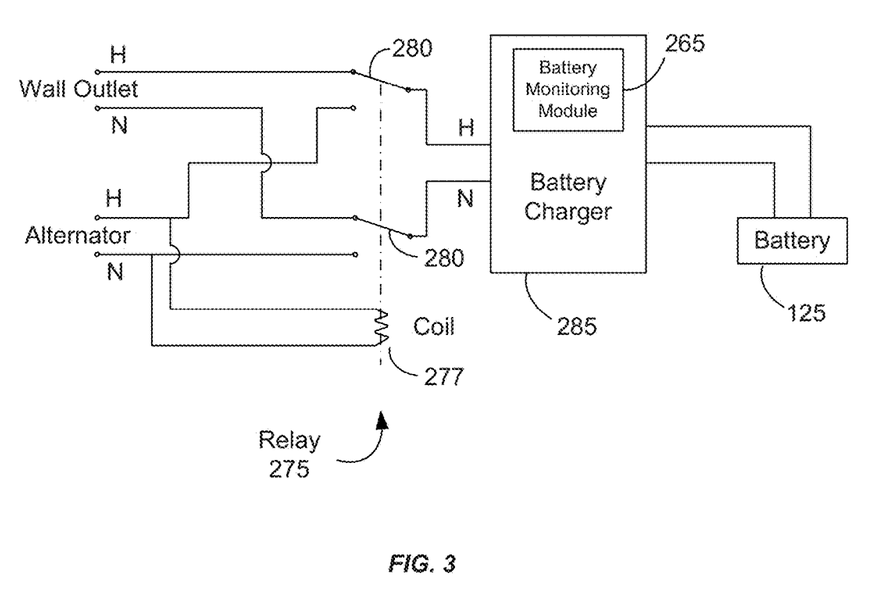
FIG. 3 depicts a double source battery charger circuit.

FIG. 3 illustrates the double source battery charger 225 in greater detail. The double source battery charger 225 is shown coupled to the battery 125 and includes a double pole relay 275, a coil 277, switches 280, and a battery charger 285 (i.e. the battery charger circuitry). The double source battery charger power sources are selectively connected by the relay 275 to the battery charger 285. For instance, the relay 275 is controlled based on the presence of AC power produced by the alternator 145. When the generator 100 is running and the alternator 145 is providing AC output, the coil 277 is energized by current from the alternator 145, causing the switches 280 to break electrical connections with the wall outlet connector 270 and to make electrical connections with the alternator 145. When the generator 100 is not running or the alternator 145 is otherwise not outputting power, the coil 277 is de-energized, causing the switches 280 to break electrical connections with the alternator 145 and to make electrical connections with the wall outlet connector 270. In some instances, rather than triggering based on the presence of alternator power, the coil 277 is coupled to the wall outlet connector 270 and triggers based on the presence of AC power from the external AC source via the wall outlet connector 270. Thus, the relay 275 automatically connects the battery charger 285 to one of the power sources of the double source battery charger 225 depending on the presence of the power sources.

Figure 4:
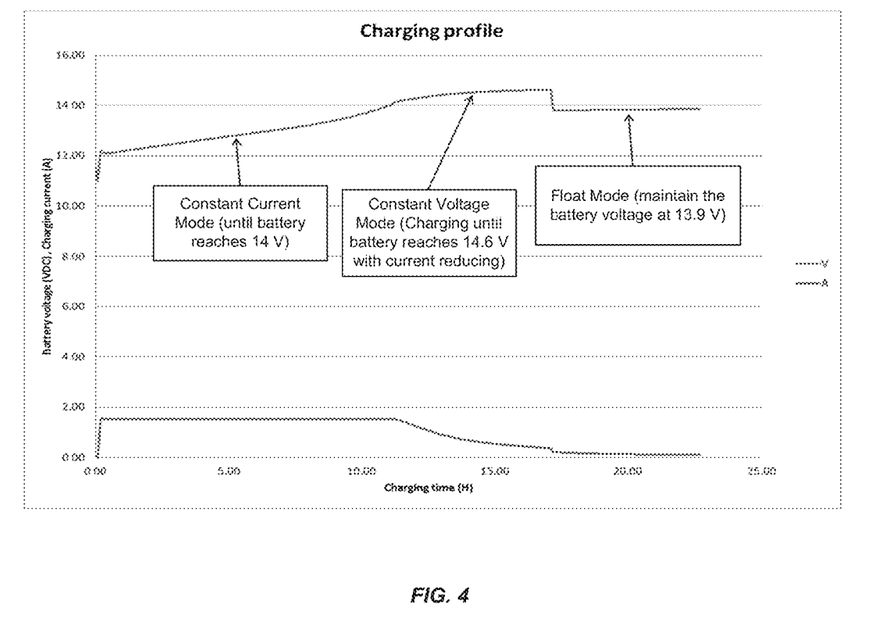
FIG. 4 illustrates a charging profile of the double source battery charger with three modes of operation.

The battery charger 285 input voltage may range from 90 to 144 Volts and 44 to 63 Hertz, or may be approximately 240 Volts and 50 Hz. The battery charger 285 includes, for instance, a rectifier and other filtering elements (not shown) to condition the received AC power and produce charging current for charging the battery 125. The battery charger 285 is operated in different charging modes to charge the battery 125 depending on the state of charge of the battery 125. FIG. 4 illustrates a plot of a charging profile of the battery 125 over time as controlled by the battery charger 285. As shown, at various stages, the battery charger 285 charges the battery 125 in a constant current mode, a constant voltage mode, and a float mode. At t=0, the battery charger 285 provides a constant current mode where the charging voltage during the constant current mode is 11 to 14 Volt DC and the charging current during the constant current mode is 0.5 to 0.75 Amps DC. At t=A, the battery charger 285 provides a constant voltage mode where the charging voltage during constant voltage mode is 14.65 to 14.75 Volts DC, and the charging current during the constant voltage mode is 0.5 to 0.75 Amps temporally decreasing to 0.05 to 0.1 Amps. At t=B, the battery charger 285 provides a float mode where the charging voltage is maintained between 13.85 to 13.95 Volts DC.

The battery monitoring module 265 provides battery information (e.g., battery voltage) to the controller 235 or battery charger 285. In turn, the controller 235 controls the battery charger 285, or the battery charger controls itself, to operate in the appropriate modes during the charging process. For instance, the battery charger 285 begins in the constant current mode until the battery 125 reaches approximately 14 Volts, at which point the battery charger 285 enters to the constant voltage mode. The battery charger 285 remains in the constant voltage mode until the battery 125 reaches 14.6 Volts, at which point the battery charger 285 enters the float mode. In some embodiments, other battery charging techniques are implemented by the battery charger 285. Additionally, in some embodiments, different charging thresholds and current levels are used by the battery charger 285, particularly for different types of batteries (e.g., 12-Volt, 18-Volt, or 28-Volt batteries). The battery charger 285 also includes protection (not shown) that achieves dielectric protection between the input and output of the battery charger 285 of at least 1500 Volts, short circuit protection, and reverse polarity protection against connecting the battery 125 in reverse polarity.

Figure 5A:
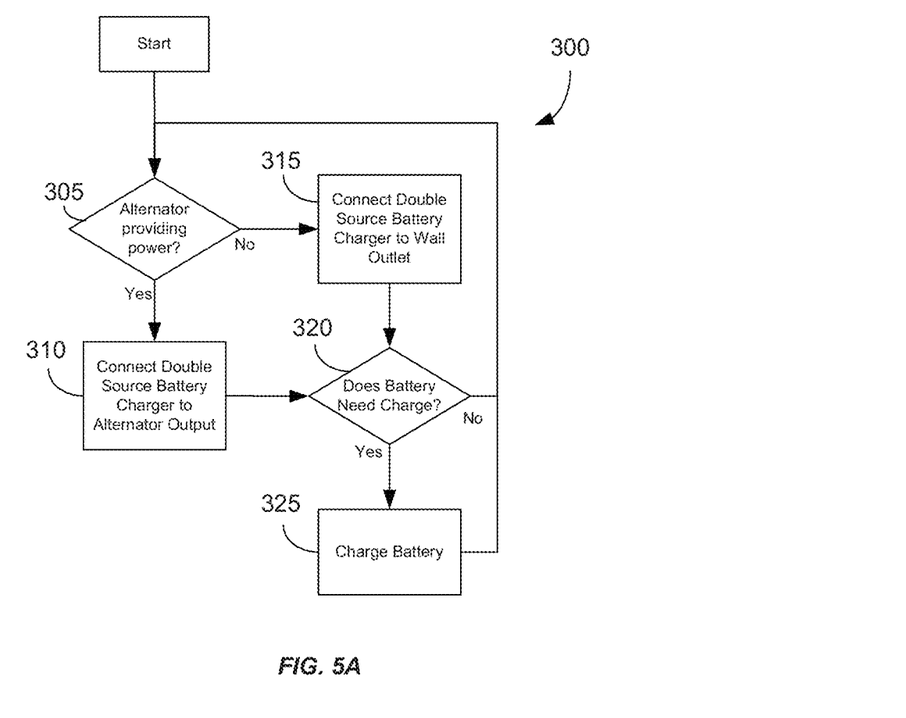
FIGS. 5A-B depict flow charts for the double source battery charger input source.

FIG. 5A illustrates a method 300 for selecting the input to the double source battery charger 225 according to an embodiment of the invention. In step 305, the relay 275 senses whether the alternator 145 is outputting power. If the alternator 145 is outputting power, the relay 275 makes (or maintains) an electrical connection between the alternator 145 and the battery charger 285 and breaks (or keeps broken) an electrical connection between the wall outlet connector 270 and the battery charger 285 (step 310). If the alternator 145 is not outputting power, the relay 275 makes (or maintains) an electrical connection between the wall outlet connector 270 and the battery charger 285, and breaks (or keeps broken) an electrical connection between the alternator 145 and the battery charger 285 (step 315).

In step 320, the controller 235 determines whether the battery 125 requires charging based on information provided by the battery monitoring module 265. For instance, if the battery 125 is below a certain voltage threshold, the controller 235 determines that the battery 125 requires charging, and proceeds to step 325. In step 325, the battery charger 285 charges the battery 125. While charging, the method 300 continues to be executed such that, if the alternator 145 ceases providing power or begins providing power, the relay 275 will switch accordingly (steps 305, 310, and 315) and the battery charger 285 will continue to charge the battery 125 (step 325), but use the alternate power source. If charging is not needed or the battery charging is completed, the battery charger 285 ceases to charge the battery 125 and the method returns to step 305.

Alternatively, in place of the relay 275, the controller 235 may monitor the presence of power from the alternator 145 and wall outlet connector 270 and selectively make and break connections accordingly.

Figure 5B:
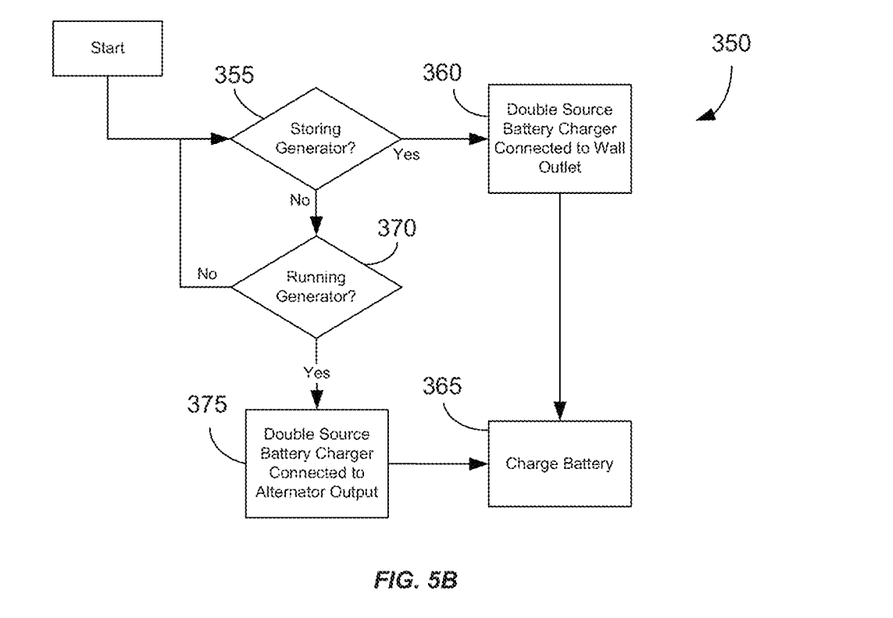

FIG. 5B illustrates a method 350 for the double source battery charger 225 according to an embodiment of the invention. In step 355, the user determines whether to store the generator. If the user stores the generator, in step 360, the user connects the generator 100 to a wall outlet, which supplies AC power to the double source battery charger 225. Thereafter, while in storage, the battery 125 of the generator 100 is charged to and/or maintained at a generally full charge state by the double source battery charger 225 (step 365). If the user does not store the generator 100 in step 355, the user determines whether to start and run the generator 100 in step 370. If not, the method 350 loops back and continues to cycle through steps 355 and 370 until the generator 100 is either stored or started by the user. Upon starting of the generator 100 in step 375, the double source battery charger 225 is connected to the output of the alternator 145. Thereafter, while running, the battery 125 of the generator 100 is charged to and/or maintained at a generally full charge state by the double source battery charger 225 (step 365).

As described in detail above, the battery 125 and the double source battery charger 225 are included on the generator 100. Thus, by coupling the generator 100 to a standard wall outlet, the battery 125 is able to be kept at full charge even when stored for extended periods of time. That is, the battery 125 does not have a gradual charge loss due to extended storage periods, the resulting low charge of which could inhibit an electric start. Additionally, the user does not need to purchase and connect a separate, external battery charger for the generator 100. Moreover, the double source battery charger 225 is a regulated charger that is specifically configured to not overcharge the battery 125 (see, e.g., FIG. 4). With an unregulated charger, the battery 125 could be overcharged in instances where the generator 100 is run for long periods of time, or could be undercharged in other instances. Overcharging and undercharging the battery 125 would reduce the life expectancy thereof. Accordingly, use of the regulated charger 225 extends the life of the battery 125.

Accordingly, embodiments of the invention provide a generator having a double source battery charger and methods for the same.

What is claimed is:

1. A method of charging a battery in a generator having a double source battery charger, an electric starter motor, an internal combustion engine, and an external power connector, the method comprising:
    coupling the battery to the electric starter motor to start the internal combustion engine;
    driving an alternator, by the internal combustion engine, to produce alternator output power;
    detecting at least one selected from the group consisting of a presence of the alternator output power and an absence of external power from the external power source connector and, in response, controlling a switch to connect the alternator to the double source battery charger;
    charging the battery, by the double source battery charger, using the alternator output power from the alternator;
    detecting at least one selected from the group consisting of an absence of the alternator output power and a presence of external power from the external power connector, and, in response, controlling the switch to connect the external power source connector to the double source battery charger; and
    charging the battery, by the double source battery charger, using the external power from the external power connector.

2. The method of claim 1, wherein the step of detecting at least one selected from the group consisting of the presence of the alternator output power and the absence of external power from the external power source connector includes energizing a coil of a relay by the alternator output power.

3. The method of claim 2, wherein, in the step of controlling the switch to connect the alternator to the double source battery charger, the energized coil controls the switch.

4. The method of claim 1,
    wherein the step of detecting at least one selected from the group consisting_of the presence of the alternator output power and the absence of external power from the external power source connector includes monitoring, by a controller, at least one selected from the group consisting of the alternator output and the external power connector,
    wherein, in the step of controlling the switch to connect the alternator to the double source battery charger, the controller controls the switch.

5. The method of claim 1, further comprising:
    determining a voltage level of the battery; and
    controlling the double source battery charger to charge the battery based on the voltage level.

6. The method of claim 1, wherein charging the battery includes
    charging the battery in a constant current charging mode initially, and
    subsequently, charging the battery in a constant voltage charging mode.

7. A generator having a double source battery charger, the generator comprising:
    a battery;
    an internal combustion engine;
    an electric starter motor selectively coupled to the battery to start the internal combustion engine;
    an alternator having a rotor driven by the internal combustion engine and a stator in which alternator output power is induced when the rotor is driven, the alternator output power provided at an alternator output;
    an external power source connector operable to be coupled to an external power source and to provide external power at a connector output;
    a switch having a first input coupled to the alternator output, a second input coupled to the connector output, and a switch output; and
    a battery charger coupled to the battery and operable to charge the battery, the battery charger having a power input coupled to the switch output such that the battery charger is selectively coupled, via the switch, to one selected from the group consisting of the alternator output and connector output to charge the battery using one selected from the group consisting of the alternator output power and the external power,
    wherein the switch couples the battery charger to the alternator output power based on detecting at least one selected from the group consisting of a presence of the alternator output power and an absence of external power from the external power source connector and wherein the switch couples the battery charger to the connector output based on detecting at least one selected from the group consisting of an absence of the alternator output power and a presence of external power from the external power connector.

8. The generator of claim 7, further comprising:
    a coil coupled to the alternator output, wherein the switch and coil form a relay such that,
        when the coil is energized by the alternator output power, the switch couples the alternator output to the switch output, and
        when the coil is not energized by the alternator output power, the switch couples the connector output to the switch output.

9. The generator of claim 7, further comprising:
    a coil coupled to the connector output, wherein the switch and coil form a relay such that,
        when the coil is energized by the external power, the switch couples the connector output to the switch output, and
        when the coil is not energized by the external power, the switch couples the alternator output to the switch output.

10. The generator of claim 7, further comprising a controller having a sensor operable to monitor at least one selected from the group consisting of the alternator output and the connector output, and to control the switch based on the monitoring.

11. The generator of claim 7, further comprising a battery monitoring module operable to determine a voltage level of the battery and provide the voltage level to a controller.

12. The generator of claim 11, wherein the controller is operable to control the battery charger to charge the battery based on the voltage level.

13. The generator of claim 7, further comprising a controller operable to control the battery charger to charge the battery in at least one selected from the group consisting of a constant current charging mode, a constant voltage charging mode, and a float mode.

14. The generator of claim 7, further comprising;
a starter switch to control the electric starter motor selectively coupled to the battery to start the internal combustion engine;
a fuel tank coupled to the internal combustion engine to supply fuel thereto;
a generator output module coupled to the alternator output; and
an alternating current (AC) outlet coupled to generator output module, the AC outlet configured to connect to an external AC load.

15. The generator of claim 14, further comprising:
a frame supporting the battery, the internal combustion engine, the electric starter motor, the alternator, the fuel tank, and the battery charger; and
a folding handle coupled to the frame via a hinge.

16. A method of charging a battery in a generator having a double source battery charger, the generator further including an internal combustion engine, an electric starter motor selectively coupled to the battery to start the internal combustion engine, an alternator driven by the internal combustion engine to produce alternator output power, and an external power source connector operable to be coupled to an external power source to provide external power, the method comprising:
detecting whether at least one selected from the group consisting of the alternator is producing alternator output power and the external power source connector is providing external power;
connecting, via a double throw switch, one selected from the group consisting of the alternator and the external power source connector to an input of the double source battery charger based on the detection; and
charging the battery, by the double source battery charger, using power received at the input from the connected one selected from the group consisting of the alternator and the external power source connector.

17. The method of claim 16, wherein the step of detecting includes energizing a coil of a relay by one selected from the group consisting of the alternator output power and the external power.

18. The method of claim 17, wherein, in the step of connecting, the energized coil controls the double throw switch to connect the one selected from the group consisting of the alternator and the external power source connector to the input of the double source battery charger.

19. The method of claim 16,
wherein the step of detecting includes monitoring, by a controller, at least one selected from the group consisting of the alternator output and the external power source connector,
wherein, in the step of connecting, the controller controls the double throw switch to connect the one selected from the group consisting of the alternator and the external power source connector to the input of the double source battery charger.

20. The method of claim 16, wherein the step of charging further comprises:
charging the battery in a constant current charging mode initially, and
subsequently, charging the battery in a constant voltage charging mode.

21. The generator of claim 7, further comprising a pull starter cord to start the engine.

22. The generator of claim 7, further comprising:
a frame having,
a base portion on which the internal combustion engine is supported, and
a fuel tank above the internal combustion engine, wherein the external power source connector is located at a height higher than the base portion and lower than the fuel tank.

23. The generator of claim 14, wherein the external power source connector is located on a first face of the generator and the AC outlet is located on a second face of the generator.

* * * * *